(12) United States Patent
Springberg et al.

(10) Patent No.: US 8,711,509 B2
(45) Date of Patent: Apr. 29, 2014

(54) DISK-BASED STORAGE DEVICE HAVING READ CHANNEL MEMORY THAT IS SELECTIVELY ACCESSIBLE TO DISK CONTROLLER

(75) Inventors: David M. Springberg, Fort Collins, CO (US); Jefferson E. Singleton, Westminister, CO (US)

(73) Assignee: LSI Corporation, San Jose, CA (US)

( * ) Notice: Subject to any disclaimer, the term of this patent is extended or adjusted under 35 U.S.C. 154(b) by 249 days.

(21) Appl. No.: 13/285,472

(22) Filed: Oct. 31, 2011

(65) Prior Publication Data

US 2013/0107391 A1    May 2, 2013

(51) Int. Cl.
*G11B 5/02*    (2006.01)

(52) U.S. Cl.
USPC .......................................................... 360/55

(58) Field of Classification Search
None
See application file for complete search history.

(56) References Cited

U.S. PATENT DOCUMENTS

| | | | |
|---|---|---|---|
| 6,212,588 B1 | 4/2001 | Bruner et al. | |
| 6,320,711 B2 | 11/2001 | Hill | |
| 6,480,349 B1 | 11/2002 | Kim et al. | |
| 6,519,104 B1 | 2/2003 | Cloke et al. | |
| 6,556,366 B2 * | 4/2003 | Patti et al. | 360/66 |
| 6,584,516 B1 | 6/2003 | Hill | |
| 7,336,435 B1 | 2/2008 | Spaur et al. | |
| 7,788,427 B1 | 8/2010 | Yang | |
| 7,872,825 B2 | 1/2011 | Sanghvi | |
| 8,307,162 B2 * | 11/2012 | Ryu et al. | 711/135 |
| 2007/0230005 A1 | 10/2007 | Yen et al. | |

FOREIGN PATENT DOCUMENTS

WO    2011065958 A1    6/2011

OTHER PUBLICATIONS

Marcus Harnisch, "Migrating from AHB to AXI Based SoC Designs," Doulos, 2010, 5 pages.

* cited by examiner

*Primary Examiner* — Paul Huber
(74) *Attorney, Agent, or Firm* — Ryan, Mason & Lewis, LLP

(57) ABSTRACT

A hard disk drive or other disk-based storage device comprises a storage disk, a read/write head configured to read data from and write data to the storage disk, and control circuitry coupled to the read/write head and configured to process data received from and supplied to the read/write head and to control positioning of the read/write head relative to the storage disk. The control circuitry comprises a disk controller and read channel circuitry, with the read channel circuitry comprising a read channel memory. The control circuitry is further configured to selectively permit the disk controller to access the read channel memory. For example, the disk controller may be permitted to access the read channel memory only when the read channel circuitry is not performing a read operation.

21 Claims, 5 Drawing Sheets

DISK-BASED STORAGE DEVICE HAVING READ CHANNEL MEMORY THAT IS SELECTIVELY ACCESSIBLE TO DISK CONTROLLER

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions in order to fit more tracks onto each storage disk, such that inter-track interference (ITI) becomes an important performance issue. A number of additional techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands.

A conventional HDD typically comprises a read channel that includes a relatively large internal memory to process data read from the storage disk. For example, the read channel is typically configured to perform iterative error correction processes on data read from the storage disk. In one possible implementation, each bit read from the disk is converted into a multi-bit digital value that is stored in the read channel memory for error correction processing. The read channel memory is generally required to store such multi-bit digital values for several sectors of the disk simultaneously, where each sector may include, for example, 4096 bytes. If six-bit digital values are used to represent the respective bits read from the disk, the read channel memory will require 24,576 bytes of storage for each sector of disk data that it is required to store. Accordingly, as the density of the storage disk increases in terms of the number of bytes stored per disk sector, the amount of read channel memory required also increases, which can significantly increase the cost and complexity of the HDD.

SUMMARY

Illustrative embodiments of the present invention provide HDDs or other types of disk-based storage devices that exhibit enhanced operating performance and lower cost by selectively permitting a disk controller of a storage device to access, under certain specified conditions, a relatively large read channel memory that the disk controller would not otherwise be permitted to access. For example, the read channel memory may be utilized for error correction in conjunction with the reading of data from the storage disk, and can be made accessible to the disk controller when the read channel is not performing read operations. This allows the read channel memory to be shared by the read channel and the disk controller, thereby reducing the total amount of memory required in the storage device.

In one embodiment, an HDD or other disk-based storage device comprises a read/write head configured to read data from and write data to a storage disk, and control circuitry coupled to the read/write head and configured to process data received from and supplied to the read/write head and to control positioning of the read/write head relative to the storage disk. The control circuitry comprises a disk controller and read channel circuitry, with the read channel circuitry comprising a read channel memory. The control circuitry is further configured to selectively permit the disk controller to access the read channel memory. For example, the disk controller may be permitted to access the read channel memory only when the read channel circuitry is not performing a read operation.

By way of example, the control circuitry may be configured to determine if a memory transfer involving the disk controller is required, and if the memory transfer involving the disk controller is required, to further determine if the read channel circuitry is performing a read operation. If the read channel circuitry is performing the read operation, the memory transfer is executed without utilizing the read channel memory, and if the read channel circuitry is not performing the read operation, the memory transfer is executed at least in part utilizing the read channel memory.

One or more of the embodiments of the invention provide significant improvements in disk-based storage devices. For example, by selectively permitting the disk controller to access the read channel memory, memory transfers involving the disk controller can be carried out more quickly and at lower power than would otherwise be possible. Also, the size of the disk controller memory and any associated external memory can be substantially reduced, thereby reducing the cost of the corresponding disk-based storage device.

DETAILED DESCRIPTION

Embodiments of the invention will be illustrated herein in conjunction with exemplary disk-based storage devices, controllers and associated read channel memory access control techniques. It should be understood, however, that these and other embodiments of the invention are more generally applicable to any disk-based storage device in which improved performance in terms of faster data transfers and reduced memory requirements is desired, and may be implemented using components other than those specifically shown and described in conjunction with the embodiments of the invention.

Figure 1:
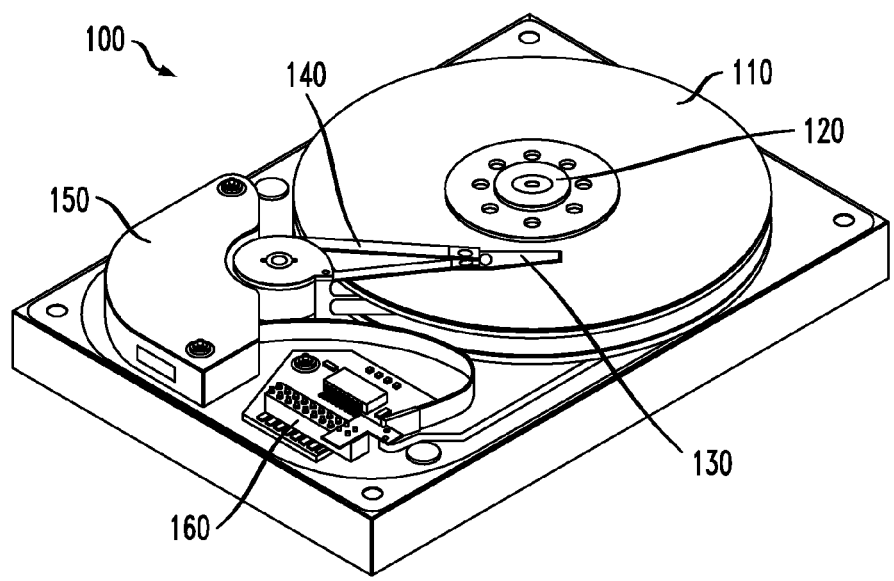
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may further encompass other elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only a single storage disk 110, read/write head 130, and positioning arm 140, this is by way of illustrative example only, and alternative embodiments of the invention may comprise multiple instances of these and other drive components. For example, one such alternative embodiment may comprise multiple storage disks attached to the same spindle so all such disks rotate at the same speed, and multiple read/write heads and associated positioning arms coupled to one or more actuators.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any storage device application in which it is desirable to significantly reduce the memory requirements of the device while also facilitating data transfers between device components. Those skilled in the art will therefore recognize that a wide variety of other storage device configurations may be used in implementing embodiments of the invention.

Figure 2:
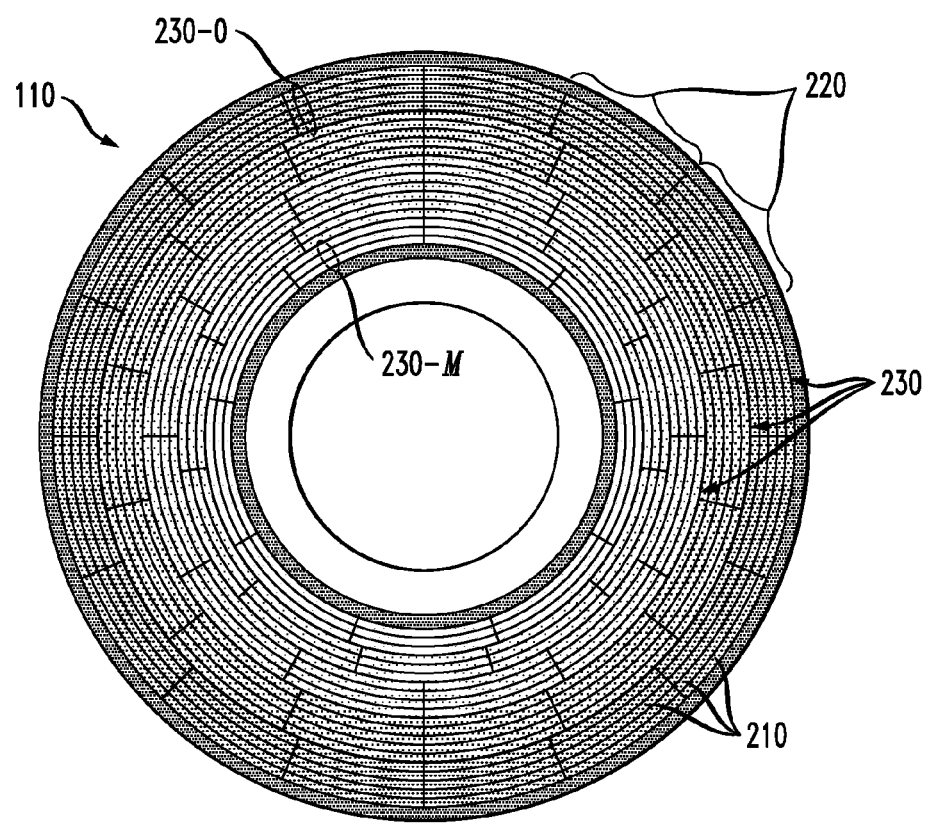
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention. Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The particular data transfer rates and other features referred to in the embodiment described above are presented for purposes of illustration only, and should not be construed as limiting in any way. A wide variety of other data transfer rates and storage disk configurations may be used in other embodiments.

An embodiment of the invention will be described below in conjunction with FIGS. 3 to 5, in which the storage device 100 of FIG. 1 is configured to implement a process for selectively controlling access of a disk controller to a read channel memory.

Figure 3:
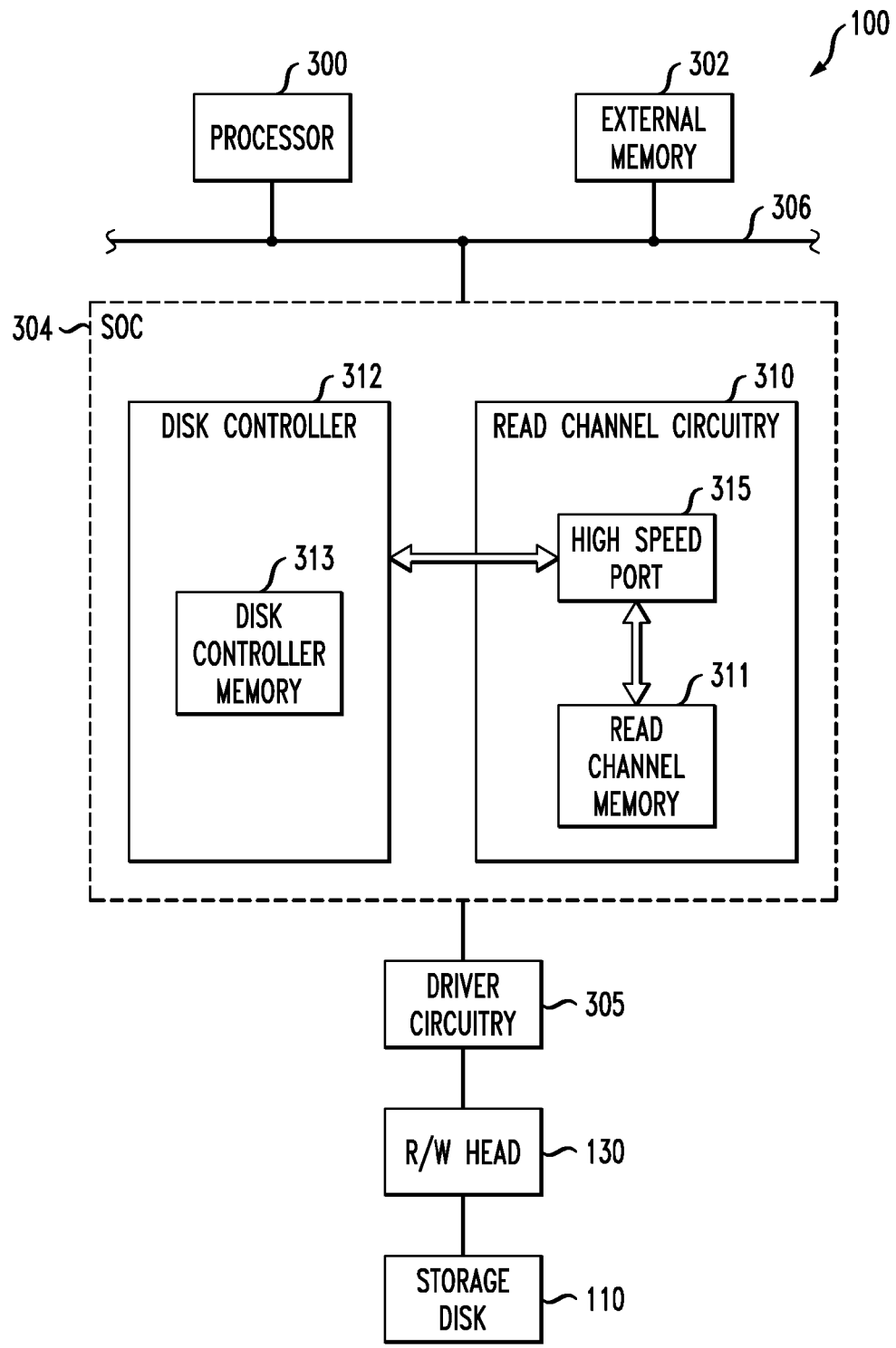
FIG. 3 is a block diagram of a portion of the storage device of FIG. 1 including an exemplary system-on-chip comprising a disk controller and read channel circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises driver circuitry 305 providing an interface between the SOC 304 and the read/write head 130. The driver circuitry 305 may comprise, for example, a preamplifier and other associated interface circuitry. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110. The read channel circuitry 310 comprises an internal read channel memory 311, and the disk controller 312 comprises an internal disk controller memory 313.

The processor 300, memory 302, SOC 304 and driver circuitry 305 may be viewed as collectively comprising one possible example of "control circuitry" as that term is utilized herein.

Numerous alternative arrangements of control circuitry may be used in other embodiments, and such arrangements may include only a subset of the components 300, 302, 304 and 305, or portions of one or more of these components. For example, the SOC 304 itself may be viewed as an example of "control circuitry."

The control circuitry of the storage device 100 as shown in FIG. 3 is therefore generally configured to process data received from and supplied to the read/write head 130 and to control positioning of the read/write head 130 relative to the storage disk 110, and is further configured to selectively permit the disk controller 312 to access the read channel memory 311 under certain conditions. This access may be provided via a high speed port 315 associated with the read channel memory 311.

By way of example, the control circuitry may be configured so as to permit the disk controller to access the read channel memory 311 only when the read channel circuitry 310 is not performing a read operation.

As indicated above, the read channel memory 311 is typically required to be a relatively large memory, in order to support iterative error correction processes performed by the read channel circuitry on data read from the storage disk 110. Also, the size of the read channel memory increases with the storage density of the disk. Conventional storage devices typically do not allow components such a disk controller to access the read channel memory, regardless of the read operation status of the read channel. Accordingly, in a conventional storage device, the external memory and disk controller memory must also be made relatively large, in order to accommodate memory transfers required by the disk controller.

The present embodiment overcomes this drawback of conventional practice by recognizing that the read channel memory is largely unused when the read channel circuitry is not performing read operations, and can therefore be made selectively accessible to the disk controller in order to achieve a reduction in the required size of at least one of the external memory 302 and the disk controller memory 313.

More particularly, the control circuitry may be configured to determine if the read channel circuitry 310 is performing a read operation and to permit the disk controller 312 to access the read channel memory 311 via high speed port 315 only if the read channel circuitry 310 is not performing a read operation. The high speed port 315 may comprise, for example, an otherwise conventional access interface with burst support.

The present embodiment therefore allows a read channel memory that would normally only be utilized in conjunction with disk reads to be utilized by the disk controller for general purpose memory transfers. This improves the usage efficiency of the large read channel memory of the storage device, which will not only improve performance but also reduce cost by reducing the need for additional memory capacity in the storage device.

In the present embodiment, certain operations of the SOC 304 may be directed by processor 300, which executes code stored in external memory 302. For example, the processor 300 may be configured to execute code stored in the memory 302 for performing at least a portion of a read memory access control process carried out by the SOC 304. Thus, at least a portion of the read channel memory access control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, driver circuitry 305 and bus 306. Alternatively, portions of the processor 300, memory 302, driver circuitry 305 and bus 306 may be implemented at least in part in the form of one or more additional integrated circuits, such as otherwise conventional integrated circuits designed for use in an HDD and suitably modified to support access control for read channel memory 311 as disclosed herein. An example of an SOC integrated circuit that may be modified to incorporate aspects of the present invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment of the invention that is an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Figure 4:
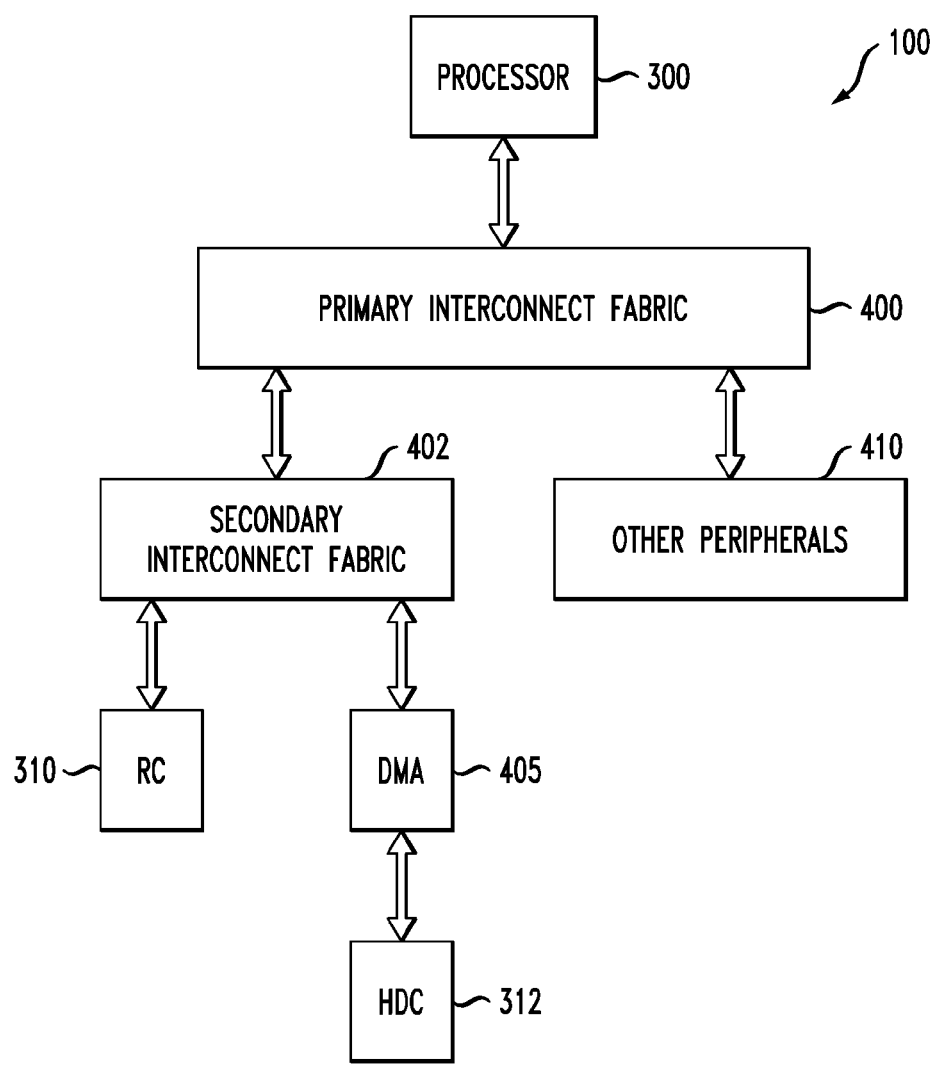
FIG. 4 shows another view of a portion of the storage device of FIG. 1.

FIG. 4 illustrates in greater detail the interconnection among certain components of the storage device 100. As shown in this view, the storage device 100 includes primary and secondary interconnect fabrics 400 and 402, which may be considered part of the bus 306 of FIG. 3. These primary and secondary interconnect fabrics are more particularly implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein.

The processor 300 of storage device 100 is coupled to the primary interconnect fabric 400, and communicates over this interconnect fabric with one or more other peripheral components 410, such as the external memory 302 or an associated host computer. The read channel (RC) circuitry 310 and disk controller (HDC) 312 are coupled to the secondary interconnect fabric 402. The read channel circuitry 310 is directly coupled to this secondary interconnect fabric, while the disk controller 312 is coupled to the secondary interconnect fabric via a direct memory access (DMA) engine 405.

The interconnect fabrics 400 and 402 and the DMA engine 405 are configured to facilitate access of the disk controller 312 to the read channel memory 311 during periods of time in which the read channel circuitry 310 is not reading data from the storage disk 110.

The DMA engine 405 may be configured to operate as a master device on the secondary interconnect fabric 402. More particularly, the DMA engine can initiate burst transfers to and from the read channel memory 311, using a specified maximum burst length. Layering of the interconnect fabrics into primary and secondary fabrics 400 and 402 as shown in FIG. 4 helps to facilitate DMA accesses to the read channel memory 311 without preventing the processor 300 from accessing other peripherals 410.

It is to be appreciated that the particular component interconnection arrangement shown in FIG. 4 is presented by way of example only, and other embodiments of the invention may utilize other types of interconnect fabrics.

Figure 5:
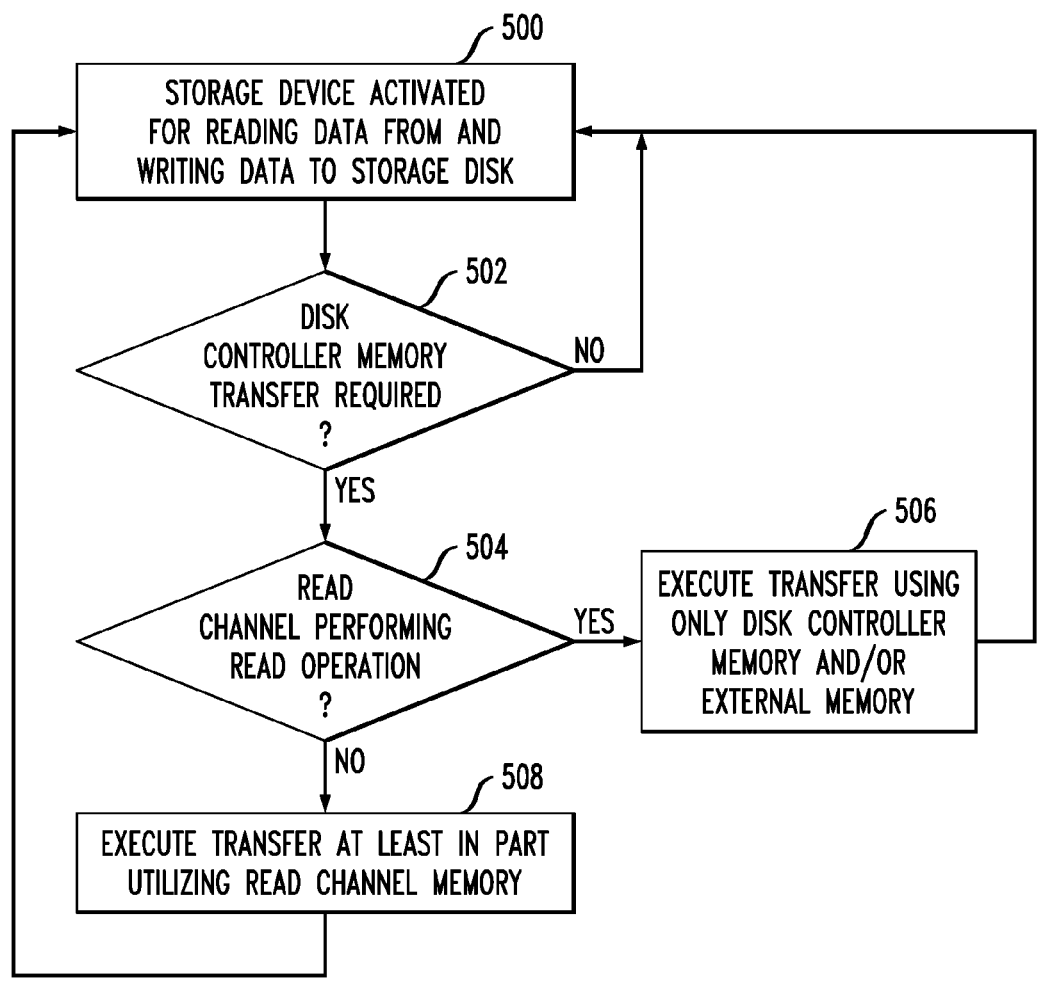
FIG. 5 is a flow diagram of read channel memory access control process implemented in the system-on-chip of FIG. 3.

Referring now to FIG. 5, a read channel memory access control process implemented in the storage device 100 is shown. The process includes steps 500 through 508, which are performed by control circuitry of the storage device 100, such as portions of SOC 304, possibly in conjunction with one or more device components.

In step 500, the storage device 100 is activated for reading data from and writing data to the storage disk 110. This may involve simply turning the storage device on, or selecting a particular one of several available modes of operation.

In step 502, the control circuitry determines if a memory transfer involving the disk controller 312 is required. For example, the memory transfer may involve the disk controller 312 transferring data to or from the external memory 302. The disk controller 312 typically performs many operations that do not involve reading data from the storage disk 110 via the read channel circuitry 310, including disk write operations and transfers of data to or from processor 300, external memory 302 or a host computer. All of such operations involve "memory transfers" as that term is broadly used herein.

If a memory transfer involving the disk controller 312 is not required, the process returns to step 500 to await another potential memory transfer for which the determination of step 502 will be repeated.

If it is determined in step 502 that a memory transfer involving the disk controller 312 is required, the control circuitry further determines in step 504 whether or not the read channel circuitry 310 is currently performing a read operation involving the reading of data from the storage disk 110.

If it is determined in step 504 that the read channel circuitry 310 is performing the read operation, the memory transfer is executed without utilizing the read channel memory 311. For example, the memory transfer may be executed using one or both of the external memory 302 and the disk controller memory 313, without any use of the read channel memory 311, as indicated in step 506. The process then returns to step 500 to await another potential memory transfer for which the determination of step 502 will be repeated.

If it is determined in step 504 that the read channel circuitry 310 is not performing the read operation, the memory transfer is executed at least in part utilizing the read channel memory 311, via the high speed port 315, as indicated in step 508. The process returns to step 500 to await another potential memory transfer for which the determination of step 502 will be repeated.

The steps of the FIG. 5 process are therefore repeated for multiple memory transfers that involve the disk controller 312, so as to selectively permit certain ones of those transfers to access the read channel memory 311, depending on whether or not the read channel is performing a read operation.

In the FIG. 5 process, the high speed port 315 to the read channel memory 311 may be utilized by the disk controller 312 to access the read channel memory for all memory transfers other than those which occur when the read channel circuitry 310 is performing read operations. The term "read operation" in this context is intended to be broadly construed, so as to encompass, by way of example, operations such as error correction that are performed by the read channel circuitry 310 on data read from the storage disk, as well as other operations performed on data read from the disk and stored in the read channel memory 311.

The disk controller 312 in the present embodiment can transfer data in and out of the read channel memory 311 at high speed. For example, data received from a host computer could be transferred by the disk controller directly to the read channel memory instead of to the external memory 302. If a given host transfer can be fit entirely within the read channel memory, the corresponding data can avoid external memory 302 altogether, thereby saving power and reducing overall external memory bandwidth requirements. Numerous other types of memory transfers involving the disk controller 312 can be facilitated by using the read channel memory 311 instead of one or both of the external memory 302 and the disk controller memory 313.

As is apparent from the above, avoiding access to the external memory 302 generally allows memory transfers to be performed at higher speed and at reduced power. Thus, the amount of memory capacity required in the storage device can be significantly reduced, which reduces cost, power consumption and complexity.

It should be noted that read channel memory sizes are generally increasing as HDD storage densities increase, due to the need for additional processing to improve signal-to-noise ratio (SNR) of the readout waveforms. The read channel memory access control process disclosed herein can take advantage of this increasing read memory size to provide additional support for disk controller memory transfers, thereby reducing the amount of memory that is required external to the read channel.

The various process operations shown in FIG. 5 are presented by way of illustrative example, and should not be construed as limiting in any way. In other embodiments, additional or alternative processing steps may be used, and the ordering of such steps may be varied relative to the arrangements shown. For example, steps indicated as being performed serially in the figure may be performed at least in part in parallel with one another.

As mentioned previously, the storage device configuration can be varied in other embodiments of the invention. For example, the storage device may comprise a hybrid HDD which includes a flash memory in addition to one or more storage disks. In an embodiment of this type, the flash memory is usually too slow to support a given memory transfer to the storage disk or a host computer, so data must first be transferred from the flash memory to a faster memory before starting the transfer to the storage disk or host computer. The techniques disclosed herein allow the read channel memory to be used as the faster memory, thereby avoiding the need for the external memory to serve this function, and saving power and external memory bandwidth.

It is also to be appreciated that the particular storage disk configuration and recording mechanism can be varied in other embodiments of the invention. For example, recording techniques such as shingled magnetic recording (SMR) and bit-patterned media (BPM) can be used in one or more embodiments of the invention.

Figure 6:
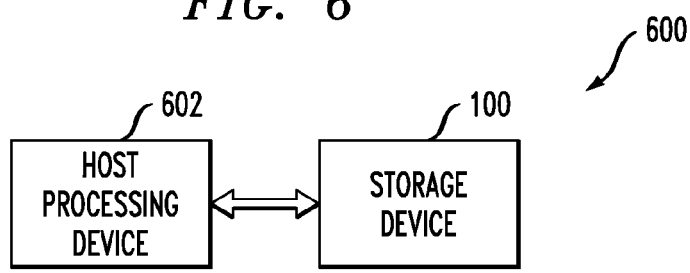
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
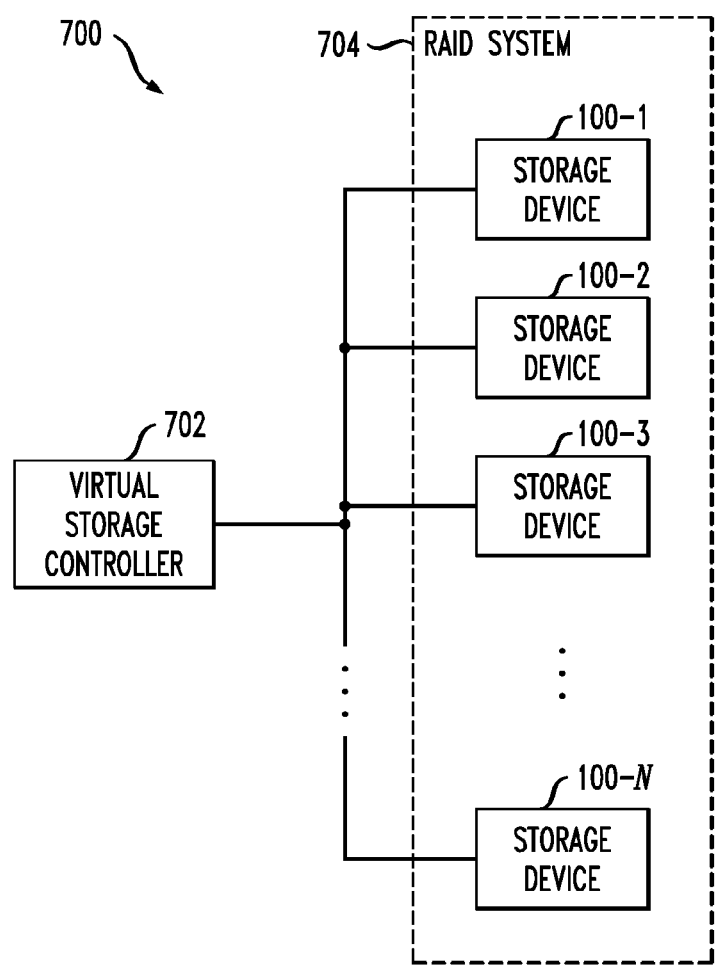
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . 100-N, one or more of which are assumed to be configured to include read channel memory access control functionality as disclosed herein. These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of storage disks, read/write heads, control circuitry and other storage device elements for implementing the described functionality. Also, the particular manner in which a disk controller is selectively provided with access to a read channel memory may be varied in other embodiments. These and numerous other alternative embodiments within the scope of the following claims will be apparent to those skilled in the art.

What is claimed is:

1. An apparatus comprising:
   a read/write head configured to read data from and write data to a storage disk; and
   control circuitry coupled to the read/write head and configured to process data received from and supplied to the read/write head and to control positioning of the read/write head relative to the storage disk;
   wherein the control circuitry comprises:
   a disk controller; and
   read channel circuitry comprising a read channel memory;
   the control circuitry being configured to selectively permit the disk controller to access the read channel memory, wherein the disk controller is permitted to access the read channel memory when the read channel circuitry is not performing a read operation.

2. The apparatus of claim 1 wherein disk controller has at least one associated memory comprising at least one of an internal memory of the disk controller and an external memory of the control circuitry.

3. The apparatus of claim 1 wherein at least the disk controller and the read channel circuitry are collectively implemented in the form of a system-on-chip integrated circuit.

4. The apparatus of claim 1 wherein read channel circuitry comprises a high speed port through which the disk controller is selectively permitted to access the read channel memory.

5. The apparatus of claim 1 wherein the disk controller is permitted to access the read channel memory only when the read channel circuitry is not performing the read operation.

6. The apparatus of claim 1 wherein the control circuitry is configured to determine if the read channel circuitry is performing the read operation and to permit the disk controller to access the read channel memory only if the read channel circuitry is not performing the read operation.

7. The apparatus of claim 1 wherein the control circuitry is configured to determine if a memory transfer involving the disk controller is required, and if the memory transfer involving the disk controller is required, to further determine if the read channel circuitry is performing the read operation, wherein if the read channel circuitry is performing the read operation, the memory transfer is executed without utilizing the read channel memory, and if the read channel circuitry is not performing the read operation, the memory transfer is executed at least in part utilizing the read channel memory.

8. The apparatus of claim 7 wherein if the read channel circuitry is performing the read operation, the memory transfer is executed utilizing at least one of an internal memory of the disk controller and an external memory of the control circuitry comprising the read channel memory and the disk controller.

9. The apparatus of claim 1 further comprising a processor and a memory coupled to the processor, the processor being configured to execute software code stored in the memory, wherein the software code when executed causes the control circuitry to selectively control access of the disk controller to the read channel memory.

10. The apparatus of claim 1 wherein the disk controller is permitted to access the read channel memory for memory transfers including transferring data to or from at least one of an external memory, a processor and a host computer, and not including reading data from the storage disk.

11. A storage device comprising the apparatus of claim 1 and its associated storage disk.

12. The storage device of claim 11 wherein the storage device comprises a hard disk drive.

13. A virtual storage system comprising the apparatus of claim 1.

14. A method comprising the steps of:
    configuring a storage device to include read channel circuitry comprising a read channel memory; and
    selectively permitting a disk controller of the storage device to access the read channel memory, wherein the step of selectively permitting the disk controller to access the read channel memory further comprises permitting the disk controller to access the read channel memory if the read channel circuitry is not performing a read operation.

15. The method of claim 14 wherein the step of selectively permitting the disk controller to access the read channel memory further comprises the step of:

determining if the read channel circuitry is performing the read operation; and permitting the disk controller to access the read channel memory only if the read channel circuitry is not performing the read operation.

16. The method of claim 14 wherein the step of selectively permitting the disk controller to access the read channel memory further comprises the steps of:

determining if a memory access involving the disk controller is required;

if the memory access involving the disk controller is required, determining if the read channel circuitry is performing the read operation;

if the read channel circuitry is performing the read operation, executing the memory transfer without utilizing the read channel memory; and if the read channel circuitry is not performing the read operation, executing the memory transfer at least in part utilizing the read channel memory.

17. The method of claim 16 wherein if the read channel circuitry is performing the read operation, the memory transfer is executed utilizing at least one of an internal memory of the disk controller and an external memory of control circuitry comprising the read channel memory and the disk controller.

18. A non-transitory computer-readable storage medium having embodied therein executable code for performing the steps of the method of claim 14.

19. A processing system comprising:

a processing device; and a storage device coupled to the processing device and comprising at least one storage disk;

wherein the storage device further comprises:

a read/write head configured to read data from and write data to the storage disk; and control circuitry coupled to the read/write head and configured to process data received from and supplied to the read/write head and to control positioning of the read/write head relative to the storage disk;

wherein the control circuitry comprises:

a disk controller; and read channel circuitry comprising a read channel memory;

the control circuitry being configured to selectively permit the disk controller to access the read channel memory, wherein the disk controller is permitted to access the read channel memory when the read channel circuitry is not performing a read operation.

20. The system of claim 19 wherein the processing device comprises a computer that incorporates the storage device.

21. The system of claim 19 wherein the system comprises a virtual storage system that includes said storage device and one or more additional storage devices.

* * * * *